July 11, 1939.  G. A. JOHNSON ET AL  2,165,383
SHOCK ABSORBING MECHANISM
Filed Feb. 21, 1938  3 Sheets-Sheet 3
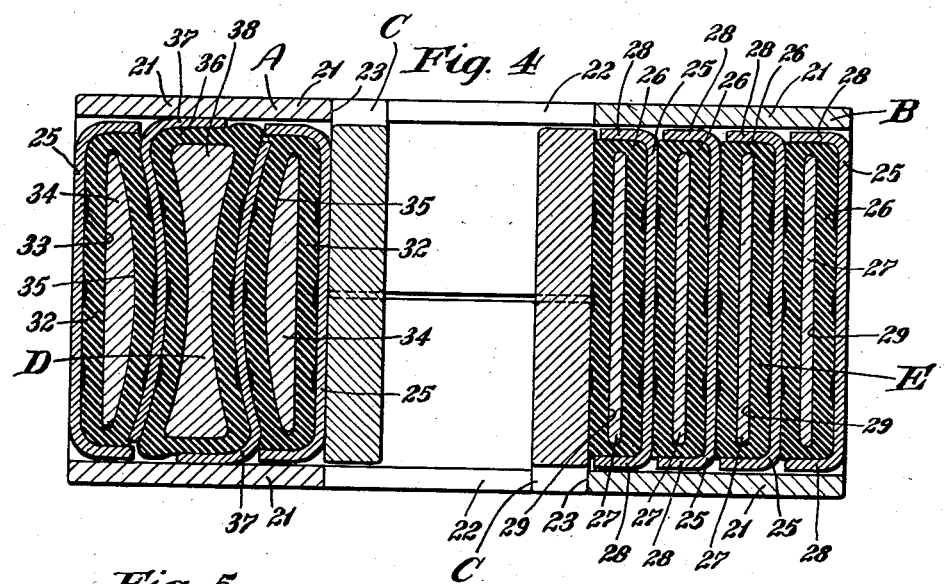
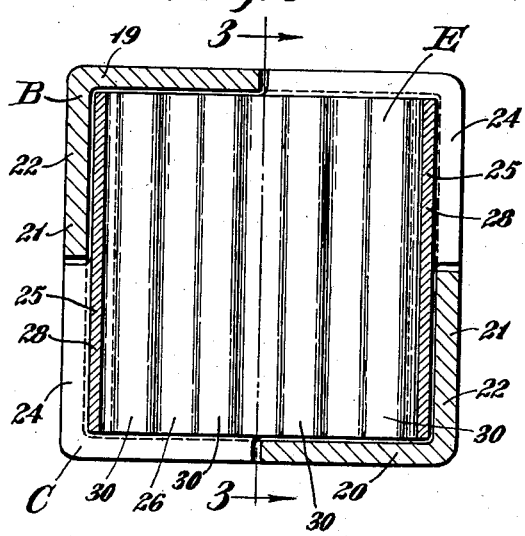
Inventors
George A. Johnson
Edward H. Lehman
By Henry Fuchs
Atty.

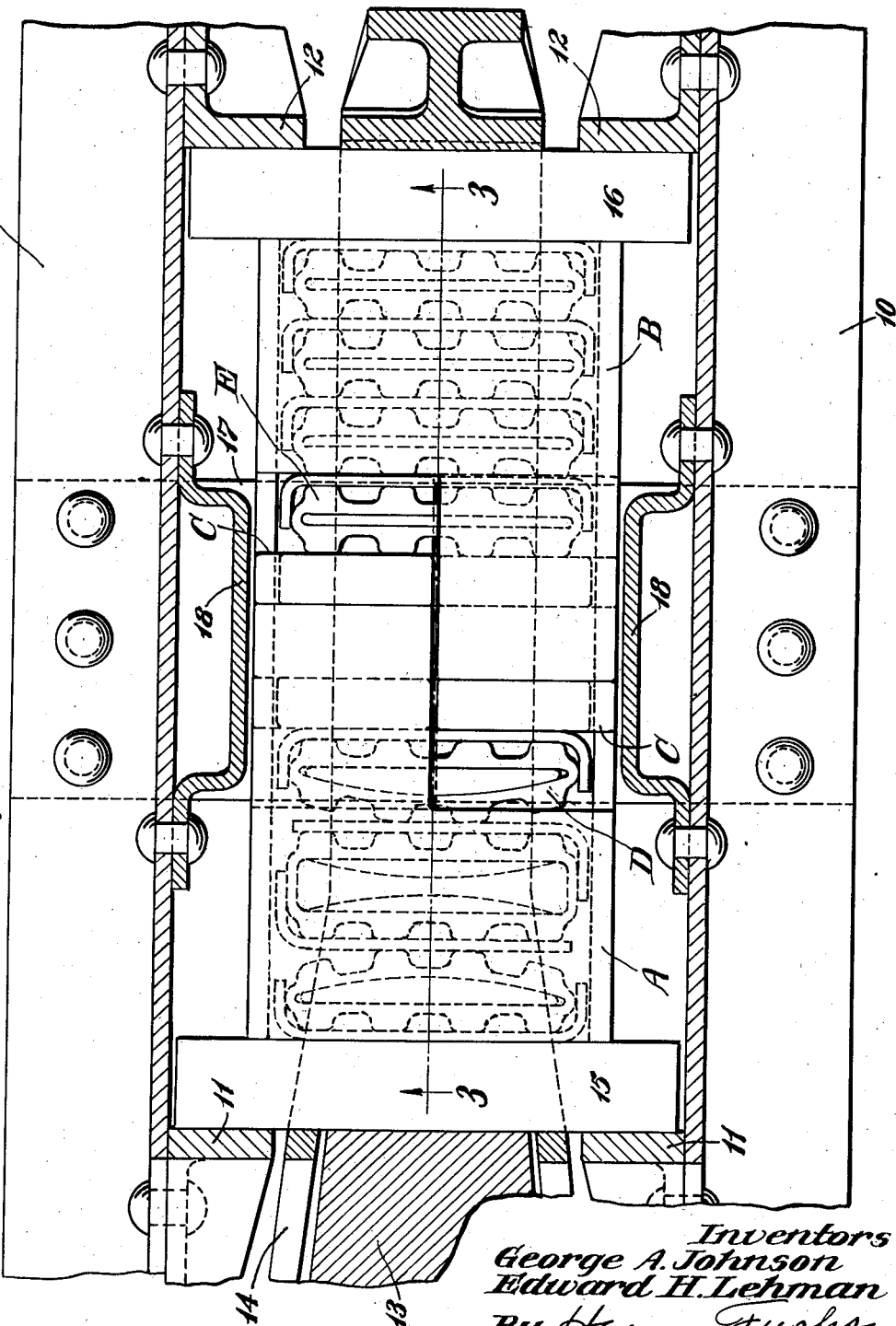

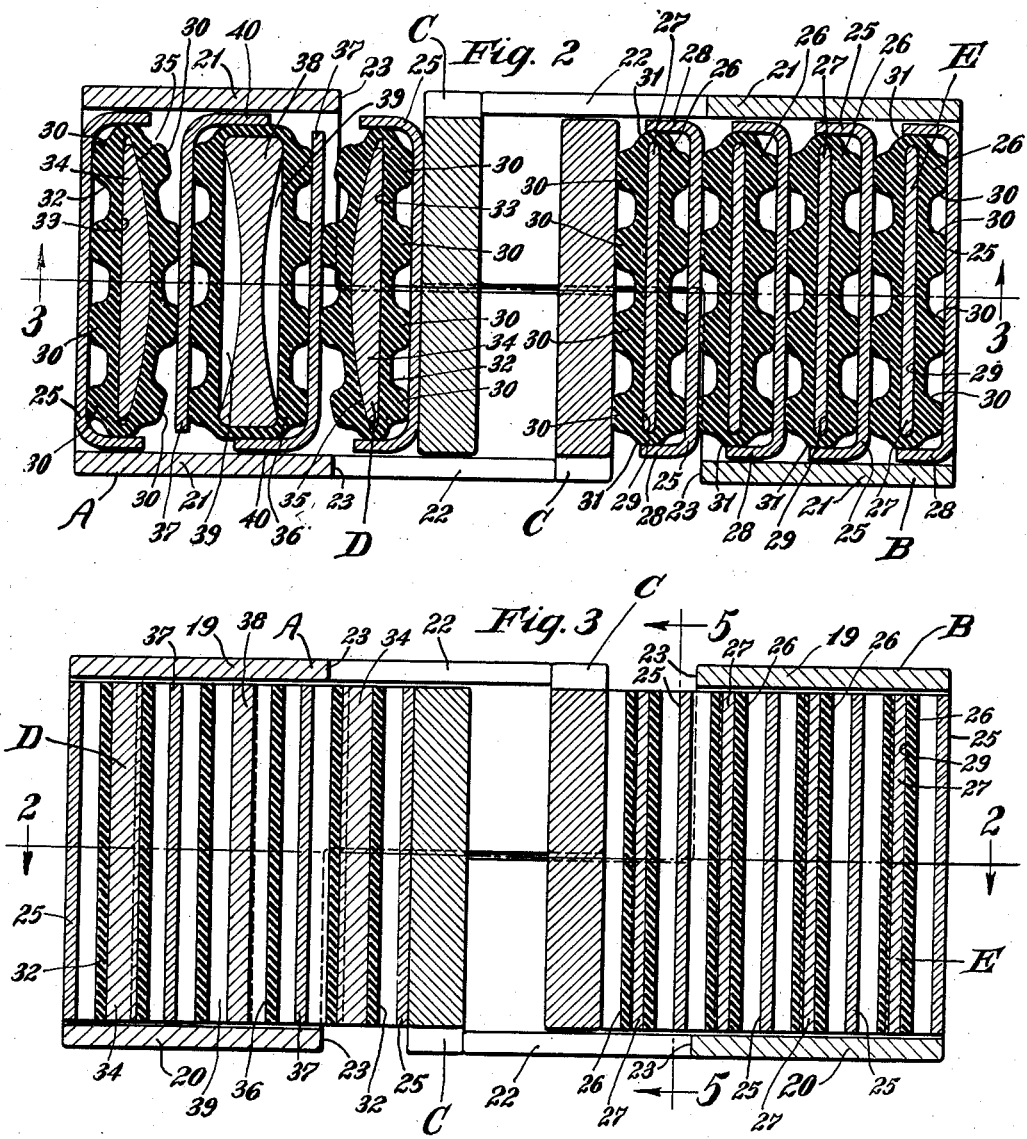

Patented July 11, 1939

2,165,383

UNITED STATES PATENT OFFICE 2,165,383

SHOCK ABSORBING MECHANISM

George A. Johnson and Edward H. Lehman, Chicago, Ill., assignors to W. H. Miner, Inc., Chicago, Ill., a corporation of Delaware Application February 21, 1938, Serial No. 191,697

15 Claims. (Cl. 213—53)

This invention relates to improvements in shock absorbing mechanisms.

One object of the invention is to provide a shock absorbing mechanism especially adapted for railway cars, comprising cushioning means of resilient material including a plurality of units in the form of rubber mats or pads having metal inserts wherein the units are compressible between metal spacing members, the rubber mats or pads being so designed and arranged in such a manner with respect to the inserts and spacing members, that the material of said mats or pads is adapted to be readily displaced to permit distortion thereof under compression to provide the required resilient action.

Another object of the invention is to provide a mechanism as set forth in the preceding paragraph wherein the spacing members are made of spring material and are adapted to be flexed during compression of the mechanism, thereby augmenting the shock absorbing capacity provided by the rubber mats or pads.

A further object of the invention is to provide a shock absorbing mechanism including cushioning means composed of a plurality of metal plate members arranged in series and rubber cushioning material interposed between adjacent plate members, compressible therebetween, wherein alternate plate members are of spring material adapted to be flexed during compression of the mechanism, and the remaining plate members act as pressure transmitting elements so formed as to forcibly produce flexing of the spring plate members during operation of the mechanism.

A still further object of the invention is to provide a mechanism as set forth in the preceding paragraph wherein the rubber material between adjacent plate members is in the form of a pad or mat within which one of said adjacent plate members is imbedded, the pad being provided with a pocket to accommodate said plate member.

Still another object of the invention is to provide a cushioning unit for shock absorbing mechanisms comprising a rubber pad or mat and a metal backing plate in the form of an insert accommodated in a pocket in the pad, the rubber material forming the walls of said pocket having shiftable contact with the plate, thereby permitting sufficient freedom of movement of the contacting material of the pad with respect to the surfaces of the plate to accommodate displacement or flow of the material of said pad due to distortion of the same under compression forces.

Yet another object of the invention is to provide a cushioning unit as set forth in the preceding paragraph, wherein the rubber pad thereof has spaced elevated projecting portions on the pressure receiving surfaces thereof, whereby the body acts as a yielding backing for the elevated portions and the material of said elevated portions, when subjected to compression, is displaceable into the body portion of the mat and the resultant thickening of the body of the mat and flattening of the projections, due to flow of the material thereof, is accommodated within the spaces provided by the depressions between the elevations of the mat.

A still further object of the invention is to provide a shock absorbing mechanism for railway draft riggings including two cushioning elements arranged to be compressed in tandem, wherein each cushioning element is composed of a plurality of metal plate members arranged in series, and rubber shock absorbing material interposed between adjacent plate members, certain of said plate members of the mechanism also forming shock absorbing members, the same being of spring material and arranged to flex under compression.

Other objects of the invention will more clearly appear from the description and claims hereinafter following.

In the drawings forming a part of this specification, Figure 1 is a horizontal sectional view through a portion of the underframe structure at one end of a railway car, illustrating our improved shock absorbing mechanism in connection therewith, the shock absorbing mechanism being shown in plan. Figure 2 is a horizontal longitudinal sectional view, corresponding substantially to the line 2—2 of Figure 3, of the improved shock absorbing mechanism only. Figure 3 is a vertical sectional view, corresponding substantially to the lines 3—3 and 3—3 of Figures 1 and 5. Figure 4 is a view, similar to Figure 2, showing the mechanism fully compressed. Figure 5 is a transverse vertical sectional view, corresponding substantially to the line 5—5 of Figure 3.

In said drawings, 10—10 indicate the longitudinally extending center or draft sills of a railway car underframe structure having the usual top and bottom flanges, the flanges at the bottom of the sills only being shown in Figure 1. On the inner sides the sills are provided with front and rear stop lugs 11—11 and 12—12 commonly employed in railway draft riggings. The rear end portion of the usual coupler shank is indicated by 13, to which is operatively connected a yoke 14 of well-known construction. Our improved shock absorbing mechanism and cooperating front and rear followers 15 and 16 are disposed within the yoke, the followers 15 and 16 cooperating respectively with the front and rear stop lugs 11—11 and 12—12 in the usual manner. A saddle plate 17 secured to the bottom flanges of the sills 10—10 underlies the yoke 14 and supports the latter and the parts contained therein. The sills 10—10 are further povided with guides 18—18 secured to the inner sides thereof, which maintain the shock absorbing mechanism centered between said sills.

Our improved shock absorbing mechanism is disposed within the yoke 14 between the front and rear followers 15 and 16 and comprises broadly front and rear casings A and B, intermediate followers C—C, and front and rear cushioning elements D and E.

The casings A and B, which are preferably in the form of castings, are of substantially identical design but are reversely arranged end for end. Each casing is of substantially rectangular cross section having spaced horizontally extending top and bottom walls 19 and 20 and spaced vertical side walls 21—21. The outer ends of the casings are open, as shown, and bear respectively on the front and rear followers 15 and 16. Each casing is also open at the opposite end. The interior of each casing is of rectangular cross section and provides a pocket in which the corresponding cushioning element D or E is accommodated. At its inner end, that is, the end remote from the main follower on which it bears, each casing is cut away or recessed at diagonally opposite top and bottom corners, as shown most clearly in Figure 5, providing a pair of longitudinally extending top and bottom arms 22—22 at the inner end of the casing. As shown in Figure 5, the cut away portions include slightly more than half of the horizontal and vertical walls of the casing. Each arm which includes part of two adjacent walls of the casing is of angular cross section. The transverse walls of the cut away portions between the arms 22—22 provide stop shoulders 23—23. As hereinbefore pointed out, the two casings are reversely arranged end for end, that is, with the arms 22—22 of one casing projecting inwardly toward the other casing and slidingly engaged within the openings between the arms 22—22 of the other casing.

The two intermediate followers C—C are of like construction, each being in the form of a relatively heavy, substantially rectangular plate having lugs or extensions 24—24 at diagonally opposite corners extending along the adjacent side edges of said follower and slidably fitting in the openings between the arms 22—22 of one of the casings and adapted to abut the outer ends of the arms of the other casing. The portion of the main body of the follower located between the lugs 24—24 thereof is of rectangular outline and of such a size as to slidingly fit within the corresponding casing. The front intermediate follower C is engaged by the arms 22—22 of the rear casing B while the rear intermediate follower C is engaged by the arms 22—22 of the front casing A.

The two cushioning elements D and E are disposed respectively within the casings A and B between the main follower 15 and the front intermediate follower C and the main follower 16 and the rear intermediate follower C. Each cushioning element D and E comprises a gang of units arranged in series. The units of the element E are all of similar design. Each unit of the last named element comprises a metal spacing plate 25, a rubber cushioning member or pad 26, and a metal backing plate or insert 27 in the rubber pad. The spacing plate 25 is of rectangular outline and has right angular flanges 28—28 at opposite ends thereof for a purpose hereinafter described. The flanged plates 25—25 are disposed transversely in the casing B with the flanges adjacent the side walls 21—21 of said casing. These plates are of such a size that slight clearance is provided between the casing walls and the top, bottom and sides of the plates, so that the latter will move freely lengthwise in the casing without any danger of binding.

The rubber pad 26, which is broadly of rectangular outline is seated on the corresponding plate 25 between the flanges 28—28 thereof and is held against lateral displacement by said flanges. Each pad is provided with a central pocket 29 opening through the top and bottom of said pad. This pocket 29 serves to accommodate the backing plate 27 which is of substantially rectangular outline and snugly fits said pocket. As will be evident, the pad 26 thus forms, in effect, a rubber band surrounding the plate 27. Each pad 26 is provided with four vertically extending, spaced ribs 30—30 projecting from the front and rear sides thereof. The corners of the ribs 30—30 are slightly rounded, and the base portions of said ribs where they merge with the body portion of the pad are laterally enlarged, the ribs being of tapered cross section. The material of the pad and ribs 30—30, where the latter merge with the main body portion of the pad, is also rounded off at opposite sides of each rib. As will be clear upon reference to Figure 2, the ribs at opposite sides of the pad are in alignment. Each pad 26 also has the opposite side ends thereof rounded off, as indicated at 31—31, said rounded off portions bearing respectively on the inner sides of the flanges 28—28 of the corresponding plate 25.

In the present embodiment of the invention, the casing B is shown as provided with four cushioning units, however, it will be evident that a greater or lesser number may be employed.

With the exception of the front unit of the cushioning element E, each unit thereof has the ribs 30—30, which are located at the forward side of the pad 26, bearing on the rear face of the spacing plate 25 of the adjacent unit. As shown in Figures 2, 3, and 4, the ribs 30—30 of the pad 26 of the front unit bear directly on the rear intermediate follower C, and the spacing plate 25 of the rearmost unit is positioned to bear on the rear follower 16.

The cushioning element D comprises front and rear similar units, and an intermediate unit. The front and rear units are of identical design but reversely arranged. Each of these units includes a spacing plate identical with the plate 25 of the units of the cushioning element E, hereinbefore described. Each of these units also includes a rubber pad 32 having a pocket 33 in which a backing plate 34 is seated. The backing plate 34 is of rectangular outline and has one face thereof outwardly curved or convex and the other face thereof flat. The convex face is indicated by 35. With the exception that the pocket 33 is adapted to accommodate a plate having one side thereof convex and the other side flat, the pad 32 is identical with the pad 26, hereinbefore described. The ribs on the front and rear sides of the pad 32 are also indicated by 30—30. As hereinbefore stated, the front and rear pads of the cushioning element D are reversely arranged, that is, the front unit has the spacing plate 25 at the front thereof and the convex side of the backing plate facing rearwardly, while the rear unit has the spacing plate 25 at the rear end thereof and the convex side of the backing plate facing forwardly. The rubber pad of the front unit thus presents a rearwardly facing convex face and the rear unit a forwardly facing convex face. The spacing plates 25—25 of the front and rear units bear respectively on the front main follower 15 and the front intermediate follower C.

The intermediate unit of the cushioning element D comprises a rubber pad 36, spring plates 37—37, and a backing plate 38. The pad 36 has a pocket 39 in which the plate 38 is accommodated. The backing plate 38 is of rectangular outline and has the front and rear faces thereof inwardly curved transversely of the mechanism, thus presenting front and rear concave surfaces which are complementary to the convex surfaces of the front and rear backing plates 34—34. The rubber pad 36 is in the form of a band and is otherwise similar to the pads 26 and 32 hereinbefore described, with the exception that the opposite sides of the pad are flat, instead of rounded, and the pocket 39 is made sufficiently large to accommodate the convexly faced plate 38. The spring plates 37—37 are of similar design but reversely arranged. Each plate 37 comprises a substantially rectangular body portion having a laterally projecting right angular flange 40 at one end thereof. These plates are interposed between the front and rear units and the intermediate unit of the cushioning element and bear respectively on the front and rear sides of the pad 36. The front plate 37 has the flange 40 thereof directed rearwardly in overhanging relation to the corresponding side end of the pad 36, and the rear plate 37 has the flange 40 thereof directed forwardly in overhanging relation to the opposite side end of said pad. As shown in Figures 2, 3, and 4, the ribs of the pad 26, which are also indicated by 30—30, bear directly on the inner faces of the plates 37—37.

In the operation of our improved shock absorbing mechanism, the same is compressed between the front and rear followers 15 and 16 of the draft rigging as these followers are moved relatively toward each other in either buff or draft. In a buffing action, the coupler forces the front follower 15 inwardly, compressing the mechanism against the rear follower 16 which at that time is held stationary by the rear stop lugs 12—12. In draft action the yoke is pulled outwardly by the coupler, carrying the rear follower 16 therewith, and the mechanism is compressed against the front follower 15 which at this time is held stationary by the front stop lugs 11—11.

The operation of the improved shock absorbing mechanism is as follows: As the front follower 15 moves rearwardly in buff, the front casing A is forced rearwardly therewith and the rear intermediate follower C is also forced to move rearwardly by the arms 22—22 of the front casing, which arms are in engagement with said intermediate follower. The cushioning elements D and E of the front and rear casings A and B are thus compressed respectively between the front follower 15 and the front intermediate follower C, which at this time is stationary, and the rear follower 16 and the rear intermediate follower C, the front intermediate follower being held against rearward movement by the abutting arms 22—22 of the casing B, which casing is held stationary by the rear follower 16 on which it bears. In draft the operation is reversed, the rear casing being moved forward by the rear follower 16 and the front casing being held stationary by the front follower 15, the front intermediate follower C, which moves with the casing B, compressing the front cushioning element against the front follower 15, and the rear follower 16 compressing the rear cushioning element against the rear intermediate follower C, which at this time is held stationary by the arms 22—22 of the front casing A.

As the cushioning elements D and E are compressed between the corresponding main and intermediate followers, as the parts approach the position shown in Figure 4, the rubber pads 26—26 of the cushioning element E are compressed or flattened out between the metal spacing plates 25—25 and the backing plates 27—27, and the rubber pads 32—32 and 36 of the cushioning element D are compressed between the spaced plates 25—25, backing plates 34—34, and 38, and spring plates 37—37, thereby distorting the parts by depressing the ribs 30—30 thereof and forcing the material of said ribs and body portions of said pads to be displaced or flow into the spaces between said ribs. The compression of the rubber pads thus serves to absorb the shocks. Shock absorbing capacity in addition to that provided by the rubber pads is produced by the spring plates 37—37 of the unit D, these plates being flexed during compression of the mechanism from the straight condition shown in Figures 1, 2, and 3 to the curved condition shown in Figure 4. This flexing of the plates is produced by the compression between the convex and concavely faced backing plates 34—34 and 38 of said unit.

As it is well known that rubber is substantially incompressible, the material of the ribs 30—30 must be displaced during compression of the pads, causing the material of each pad to flow, thereby effecting distortion of the pad as hereinbefore pointed out. Full compression of the mechanism is shown in Figure 4 and the compression thereof is limited by engagement of the intermediate followers C—C with the limiting stop shoulders 23—23 of the front and rear casings A and B, whereby the casings A and B, together with the intermediate followers C—C act as a solid column to transmit the pressure from one main follower to the other, thus preventing undue compression of the rubber pads.

When the actuating force is reduced, after compression of the mechanism in either buff or draft, the tendency of the distorted rubber pads to return to their normal shape and the spring plates to return to their unflexed condition causes the cushioning elements to expand, thereby returning the parts to their normal full released position shown in Figures 1, 2, and 3.

While we have herein shown and described the front and rear cushioning elements of different character, it will be evident that it is within the invention to employ similar cushioning elements in both the front and rear casings, that is, provide both of the casings A and B with cushioning elements corresponding to the element E or both of the same with cushioning elements corresponding to the combined spring plate and rubber cushioning element D. By interchanging of such elements the total capacity may be varied to produce different graduations of shock absorbing resistance as desired.

It is further pointed out that while the cushioning elements have herein been shown and described as employed in a tandem type of gear, the invention is not limited to such use and these cushioning elements may be employed in any other type of gear wherein compressible cushioning means is used to absorb shocks.

We have herein shown and described what we now consider the preferred manner of carrying out our invention, but the same is merely illustrative and we contemplate all changes and modifications that come within the scope of the claims appended hereto.

We claim:

1. In a shock absorbing mechanism, the combination with a casing; of a gang of rubber pads in said casing, each pad having spaced projections on opposite sides thereof; a gang of spacing plates, said plates being alternated with said pads and bearing on the projections of the latter; and relatively movable follower means at opposite ends of said casing bearing on opposite ends of said assembled pads and plates.

2. In a shock absorbing mechanism, the combination with a casing; of a gang of cushioning units in said casing arranged in series lengthwise of the casing, each unit including a rubber pad disposed transversely of said casing, said pad having projecting ribs on opposite sides thereof; and transversely disposed metal plates alternated with said pads, and having bearing engagement with the ribs thereof.

3. In a shock absorbing mechanism, the combination with a casing; of a gang of cushioning units in said casing arranged in series lengthwise of the casing, each unit including a rubber pad disposed transversely of the casing and a transversely disposed, metal backing plate inserted in said pad; and transversely disposed plates alternated with said pads.

4. In a shock absorbing mechanism, the combination with a casing; of a gang of cushioning units in said casing arranged in series lengthwise of said casing, each unit including a transversely disposed rubber pad having a transversely disposed, platelike, metal insert therein, said paid having spaced projecting ribs on opposite sides thereof; and spacing plates between said pads, said spacing plates being transversely disposed and bearing on the rigs of said pads.

5. In a shock absorbing mechanism, the combination with a casing; of a gang of cushioning units in said casing, each unit including a spacing plate, a transversely disposed metal backing plate, and rubber cushioning means at the front and rear sides of said backing plate and bearing thereon, said rubber cushioning means having spaced outward projections on the front and rear surfaces thereof, and said spacing plates being interposed between the rubber cushioning means of adjacent units and bearing on said projections.

6. In a shock absorbing mechanism, the combination with a casing; of a gang of cushioning units in said casing including transversely disposed backing plates, and transversely disposed spring plates, each backing plate having transversely disposed rubber cushioning means at the front and rear sides thereof, said rubber cushioning means having spaced outward projections on the front and rear outer surfaces thereof, said transversely disposed spring plates being interposed between the rubber cushioning means of adjacent units, said backing plates of adjacent units having opposed surfaces curved outwardly and inwardly respectively, between which said rubber cushioning means and spring plates are compressed to flex said spring plates.

7. In a shock absorbing mechanism, the combination with a casing; of a pair of transversely disposed front and rear backing plates in said casing, the back face of the front plate and the front face of the rear plate being curved; a transversely disposed backing plate interposed between said first named plates and having its front and rear faces complementarily curved respectively to said curved rear and front faces of the front and rear backing plates; transversely disposed rubber cushioning means at the front and rear sides of each backing plate; and transversely disposed spring plates interposed between adjacent faces of said rubber cushioning means.

8. In a shock absorbing mechanism, the combination with a casing; of a gang of cushioning units in said casing, each unit including a rubber pad having a metal, platelike insert provided with a curved surface, said rubber pad of said unit having ribs on the front and rear sides thereof; and spring plates interposed between the rubber pads of adjacent units in engaging relation with said ribs of the pads.

9. In a railway draft rigging, the combination with a casing; of follower members at opposite ends of the casing, said follower members being relatively movable toward and away from each other; and a cushioning element within said casing interposed between said followers, said cushioning element including a plurality of rubber pads and spring plates alternated with said pads, each pad having a platelike metal insert therein, adjacent inserts having their opposed faces curved inwardly and outwardly respectively.

10. In a railway draft rigging, the combination with front and rear relatively movable casings; of follower means at the front and rear ends of each casing, said follower means at the front end of the rear casing being movable in unison with said front casing and said follower means at the rear end of the front casing being movable in unison with said rear casing; and a cushioning element within each casing interposed between the follower means which is located at the front and rear ends thereof, each cushioning element including a rubber pad having projections on the front and rear sides, a metal plate on which said pad is seated with the projections thereof bearing on said plate, and a metal backing plate within each pad.

11. In a railway draft rigging, the combination with front and rear relatively movable casings; of follower means at the front and rear ends of each casing, said follower means at the front end of the rear casing being movable in unison with said front casing and said follower means at the rear end of the front casing being movable in unison with said rear casing; and a cushioning element within each casing interposed between the follower means which is located at the front and rear ends thereof, the cushioning element of one of said casings including rubber pads having projections on the front and rear sides, metal spring plates, each spring plate being interposed between adjacent pads and having its front and rear faces bearing on the projections of the adjacent pads, and metal backing plates, one of said plates being disposed within each of said pads, said backing plate of each pad having a curved abutment face opposed to the adjacent spring plate, and the cushioning element of the other casing including rubber pads having projections on the front and rear sides, metal plates which said pads are seated with the projections thereof bearing on said plates, and metal backing plates, one of said backing plates being disposed within each of said pads.

12. A cushioning element for shock absorbing mechanisms including a gang of units arranged in series, each unit comprising a metal plate, a rubber pad having spaced ribs projecting therefrom and seated on said metal plate, and a metal backing plate inserted in each pad.

13. A cushioning element for shock absorbing mechanisms including a plurality of resilient members, each comprising a rubber plate having a plurality of spaced riblike projections of rubber thereon, and a backing plate insert therein, and a plurality of metal plates alternated with said resilient members.

14. A cushioning element for shock absorbing mechanisms comprising a gang of resilient members alternated with resilient spring plates, each resilient member comprising a backing plate and a rubber pad surrounding said backing plate, said pad having spaced riblike projections on opposite sides thereof adapted to bear on the adjacent spring plates.

15. A cushioning element for shock absorbing mechanisms including a plurality of members arranged in series, and spring plates alternated with said members, each member including a metal plate surrounded by a rubber cushion in the form of a band having exterior spaced projections thereon.

GEORGE A. JOHNSON.
EDWARD H. LEHMAN.